United States Patent
Ha et al.

(10) Patent No.: US 12,450,682 B2
(45) Date of Patent: Oct. 21, 2025

(54) GRAPHICS PROCESSING UNIT (GPU)-BASED LOGIC REWRITING ACCELERATION METHOD

(71) Applicant: SHANGHAITECH UNIVERSITY, Shanghai (CN)

(72) Inventors: Yajun Ha, Shanghai (CN); Lin Li, Shanghai (CN)

(73) Assignee: SHANGHAITECH UNIVERSITY, Shanghai (CN)

( * ) Notice: Subject to any disclaimer, the term of this patent is extended or adjusted under 35 U.S.C. 154(b) by 97 days.

(21) Appl. No.: 18/537,836

(22) Filed: Dec. 13, 2023

(65) Prior Publication Data
US 2024/0289914 A1 Aug. 29, 2024

Related U.S. Application Data

(63) Continuation of application No. PCT/CN2023/083573, filed on Mar. 24, 2023.

(30) Foreign Application Priority Data

Feb. 27, 2023 (CN) .......................... 202310179690.0

(51) Int. Cl.
*G06T 1/20* (2006.01)
*G06F 9/38* (2018.01)

(52) U.S. Cl.
CPC .............. *G06T 1/20* (2013.01); *G06F 9/3851* (2013.01)

(58) Field of Classification Search
CPC ................................ G06T 1/20; G06F 9/3851
(Continued)

(56) References Cited

U.S. PATENT DOCUMENTS

2016/0055270 A1 2/2016 Chuang et al.
2016/0350469 A1 12/2016 Amarù et al.

FOREIGN PATENT DOCUMENTS

CN 102231133 A 11/2011
CN 115204076 A 10/2022

OTHER PUBLICATIONS

G. Pasandi et al., "2021 ICCAD CAD Contest Problem C: GPU Accelerated Logic Rewriting," 2021 IEEE/ACM International Conference On Computer Aided Design (ICCAD), Munich, Germany, Nov. 2021, pp. 1-6.*

(Continued)

*Primary Examiner* — Jacinta M Crawford
(74) *Attorney, Agent, or Firm* — Bayramoglu Law Offices LLC (57) ABSTRACT

A graphics processing unit (GPU)-based logic rewriting acceleration method comprising parallelizing sub-procedures of And-Inverter Graph (AIG)-based logic rewriting. A recursive sub-procedure of the AIG-based logic rewriting is redesigned to be non-recursive, to provide sufficient parallelism for a GPU. In order to parallelize a replacement step on the GPU, the present disclosure uses a lock to ensure mutually exclusive access, which inevitably damages scalability of inter-node parallelism. In order to fully utilize the inter-node parallelism on a large scale, the present disclosure proposes a work scheduler that adds nodes with non-overlapping maximum fan-out-free cones (MFFCs) to a group, such that nodes in an MFFC can be deleted simultaneously without a conflict. In order to simultaneously create and delete a same node, the present disclosure also proposes a GPU-friendly graphical data structure to support these concurrent operations.

5 Claims, 5 Drawing Sheets (58) Field of Classification Search
USPC .......................................................... 345/505
See application file for complete search history.

(56) References Cited

OTHER PUBLICATIONS

H. Riener et al., "On-the-fly and DAG-aware: Rewriting Boolean Networks with Exact Synthesis," 2019 Design, Automation & Test in Europe Conference & Exhibition (DATE), Florence, Italy, Mar. 2019, pp. 1649-1654.*

C. Yu et al., "Fast Algebraic Rewriting Based on And-Inverter Graphs," in IEEE Transactions on Computer-Aided Design of Integrated Circuits and Systems, vol. 37, No. 9, Sep. 2018, pp. 1907-1911.*

Lin Li, et al., A Recursion and Lock Free GPU-Based Logic Rewriting Framework Exploiting Both Intranode and Internode Parallelism, IEEE Transactions on Computer-Aided Design of Integrated Circuits and Systems, 2023, pp. 3972-3984, vol. 42, No. 11.

Shiju Lin, et al., NovelRewrite: Node-Level Parallel AIG Rewriting, DAC '22: Proceedings of the 59th ACM/IEEE Design Automation Conference, 2022, pp. 427-432.

Vinicius Possani, et al., Unlocking Fine-Grain Parallelism for AIG Rewriting, IEEE/ACM International Conference on Computer-Aided Design (ICCAD), 2018, pp. 1-8.

Heinz Riener et al., Scalable Generic Logic Synthesis: One Approach to Rule Them All, DAC '19: Proceedings of the 56th Annual Design Automation Conference, 2019, pp. 1-6, Article No. 70.

Alan Mishchenko, et al., DAG-Aware AIG Rewriting, A Fresh Look at Combinational Logic Synthesis, DAC, 2006, pp. 532-535.

* cited by examiner

Algorithm 1 Parallel Bottom-Up Cut Enumeration Kernel

Require: The maximum level of subgraphs ($ML$) that were used to replace in the last scheduling period. The list of added nodes ($LAN[ML]$) in the Replacement step. The list of the scheduled nodes ($LSN$) in this scheduling period.

Ensure: The cut sets of the scheduled nodes ($LSN$) in this scheduling period.

1: function CUT_ENUMERATION_KERNEL(*list_nodes*)
   //Part1: compute the cut for added nodes, bottom to top
2:     for $slevel = 0; slevel < ML; slevel++$ do
3:         PARALLELCUTENUM_ONELEVEL(LAN[$slevel$])
4:     end for
   //Part2: compute the cuts for scheduled nodes
5:     PARALLELCUTENUM_ONELEVEL($LSN$)
6: end function

//compute the cuts for nodes at the same level concurrently
7: function PARALLELCUTENUM_ONELEVEL(*list_nodes*)
8:     while $block\_id < list\_nodes.len()$ do
9:         $node_i = list\_nodes[block\_id]$;
10:        $l_i = node_i.left\_node$;
11:        $r_i = node_i.right\_node$;
    //compute the cuts for one node in parallel
12:        $cuts_i = $ PARALLEL_MERGE($l_i.cuts, r_i.cuts$);
13:        PARALLEL_COMPUTE_BOOLEAN_FUNCTION($cuts_i$)
14:        PARALLEL_SELECT_CUTS($cuts_i$);
15:        $block\_id = block\_id + gridDim.x$;
16:     end while
17: end function

FIG. 4

Algorithm 2 Parallel Top-Down MFFC Computing Kernel

Require: List of cuts ($LC$) that need to compute MFFC.
Ensure: The computed MFFC of each cut in the work list;
1: On the GPU's shared memory, initialize two frontier lists $F_1, F_2$, and another list $MFFC$ that stores mffc nodes of one $cut$.
2: while $block\_id < LC.len()$ do
3:     $cut_i = LC[block\_id]$;
4:     $MFFC$.PUSH($cut_i.root$);
5:     $F_1$.PUSH($cut_i.root.left\_node$);
6:     $F_1$.PUSH($cut_i.root.right\_node$);
7:     while not FIND_ALL_CUT_LEAVES() do
8:         $F1$.REMOVE_DUPLICATED_NODES();
9:         for each thread $0 \leq t < blockDim.x$ in block do
10:             node $n = F1[t]$;
                //if all the fanouts of n are in MFFC
11:             if IS_MFFC_NODE($n$) then
12:                 $F2$.CONCURRENT_PUSH($n.left\_node$);
13:                 $F2$.CONCURRENT_PUSH($n.right\_node$);
14:                 $MFFC$.CONCURRENT_PUSH($n$);
15:             end if
16:         end for
17:         $F1 = F2$;
18:         $F2 = F1$;
19:     end while
20:     $block\_id = block\_id + gridDim.x$;
21: end while

FIG. 5

GRAPHICS PROCESSING UNIT (GPU)-BASED LOGIC REWRITING ACCELERATION METHOD

CROSS-REFERENCE TO RELATED APPLICATION

This application is a continuation application of International Application No. PCT/CN2023/083573, filed on Mar. 24, 2023, which is based on and claims priority to Chinese Patent Application No. 202310179690.0, filed on Feb. 27, 2023, the entire contents of which are incorporated herein by reference.

TECHNICAL FIELD

The present disclosure relates to a logic rewriting acceleration algorithm.

BACKGROUND

Logic synthesis plays an important role in optimizing a multi-level logic network in an automated design process. Before a standard unit or a programmable device is technically mapped, the logic synthesis is typically applied to a network exported by compiling a hardware description language (HDL) (such as VHDL or Verilog). The logic synthesis is also used for hardware simulation, design complexity estimation, software synthesis, and fast circuit preprocessing before equivalence check [3]. Logic rewriting is an effective technique for optimizing the multi-level logic network and plays an increasingly important role in a logic synthesis process. A modern integrated circuit (IC) and system on chip (SoC) each typically contains millions to trillions of logic gates. In addition, due to locality and greediness of the logic rewriting, a plurality of rounds of rewriting operations are usually required to reduce a total quantity of circuit gates. Time required to optimize the logic network is increasing with a modern serial logic rewriting algorithm. Therefore, parallel logic rewriting is crucial for accelerating the logic synthesis for a large-scale design.

In the past few decades, many logic rewriting algorithms based on different logical network representations, such as And-Inverter Graph (AIG), Majority-Inverter Graph (MIG), and Xor-Majority Graph (MIG), have been proposed. In addition, according to a conclusion drawn from reference [1], logic rewriting algorithms based on different logical representations share similar computation modes. Therefore, an AIG-based parallel rewriting algorithm can be easily converted into an algorithm based on another logical network representation. An AIG-based serial logic rewriting algorithm is proposed in reference [2] and has been well implemented in an industrial-grade logic synthesis tool ABC. Currently, AIG-based parallel algorithms include a central processing unit (CPU)-based parallel algorithm and a graphics processing unit (GPU)-based parallel algorithm. A CPU-based parallel logic rewriting algorithm [3] utilizes inter-node parallelism, but uses a lock to ensure mutually exclusive access between threads. A GPU-based parallel logic rewriting algorithm [4] accelerates some algorithms based on node-level parallelism. The GPU-based parallel logic rewriting algorithm also proposes a logical cut that can be used for replacement, which has been proven to be correct.

However, a most advanced CPU-based parallel logic rewriting algorithm [3] cannot utilize more intra-node parallelism. Specifically, for each node, an allocated thread still sequentially executes all internal procedures of the logic rewriting algorithm. If all these sub-procedures are parallelized and different nodes are still processed in parallel, more parallelism can be extracted. In addition, the most advanced CPU-based parallel logic rewriting algorithm [3] extensively uses locks to ensure thread exclusivity when changing a same node in order to parallelize a replacement step in logic rewriting, which greatly reduces effectiveness of the inter-node parallelism. The GPU-based parallel logic rewriting algorithm [4] only accelerates cut enumeration and evaluation steps based on the node-level parallelism. The two steps are only run once on an original logic network and are not re-executed when the logic network is updated. Therefore, to ensure that replacement of each node still has a benefit, a replacement step of updating the logic network is serially executed on a CPU. This results in a significant amount of unnecessary communication between the CPU and a GPU, greatly reducing efficiency of parallelization.

CITED REFERENCES

[1] H. Riener, E. Testa, W. Haaswijk, A. Mishchenko, L. Amaru, G. DeMicheli, and M. Soeken. Scalable generic logic synthesis: One approach to rule them all. In 2019 56th ACM/IEEE Design Automation Conference (DAC), pages 1-6, 2019.
[2] A. Mishchenko, S. Chatterjee, and R. Brayton. Dag-aware aig rewriting: a fresh look at combinational logic synthesis. In 2006 43rd ACM/IEEE Design Automation Conference, pages 532-535, 2006.
[3] V. Possan, Y.-S Lu, A. Mishchenko, K. Pingali, R. Ribas, and A. Reis. Unlocking fine-grain parallelism for aig rewriting. In 2018 IEEE/ACM International Conference on Computer-Aided Design (ICCAD), pages 1-8, 2018.
[4] S. Lin, J. Liu, T. Liu, M. D. F. Wong, and E. F. Y. Young. Novelrewrite: Node-level parallel aig rewriting. In Proceedings of the 59th ACM/IEEE Design Automation Conference, DAC '22, page 427-432, New York, NY, USA, 2022. Association for Computing Machinery.

SUMMARY

The present disclosure is intended to resolve a technical solution that an existing CPU-based parallel logic rewriting algorithm cannot utilize more intra-node parallelism and has low efficiency of parallelization.

In order to resolve the above technical problem, technical solutions of the present disclosure provide a GPU-based logic rewriting acceleration method, including parallelizing sub-procedures of AIG-based logic rewriting, which includes following steps:
  on a CPU, asynchronously selecting, by a scheduler, a group of same-level nodes from an input AIG-based logic network; then copying the nodes to a memory of a GPU, such that the GPU sequentially enables a kernel to rewrite the nodes in parallel, and selecting, by the CPU, another group of nodes for the GPU to rewrite, which completely overlaps scheduling and rewriting procedures; and on the GPU, completing parallel node rewriting through cut enumeration, maximum fan-out-free cone (MFFC) computation, evaluation, and replacement, where
  the cut enumeration adopts a parallel cut enumeration algorithm designed based on a subgraph level, to simultaneously process the same-level nodes from a low level to a high level: nodes in a subgraph used for replacement in a previous scheduling cycle are added to different LAN[slevel] lists based on a level of the subgraph, where slevel represents a local level of a node in the subgraph used for replacement, cuts of nodes in a same LAN[slevel] list are computed in parallel, and then Boolean functions corresponding to the cuts are computed; and the MFFC computation adopts a top-down computation mode to parallelize a recursive MFFC computation algorithm, where starting from a cut list on which the MFFC computation needs to be performed, each MFFC computation of a cut is allocated to a thread block, threads in the same thread block collaborate to compute an MFFC of the cut, and after the thread block obtains the corresponding cut, following steps are performed:

step 1: adding a root node of a current cut to a corresponding MFFC set of the root node, where the MFFC is a set that stores all last MFFC nodes;

step 2: adding left and right children of the root node to a buffering region F1; extracting, by each thread, a node n from the buffering region F1; if all fan-outs of the node n are in a current MFFC set, evaluating a function IS_MFFC_NODE(n) as true; and in this case, adding all the fan-outs of the node n to a buffering region F2, and adding the node n to the MFFC set;

step 3: repeating the step 2 until all nodes in the buffering region F1 are processed, and then swapping roles of the F1 and the F2; and step 4: processing one leaf node of the current cut by using a method that is the same as a method described in the steps 2 to 3, until all leaf nodes of the current cut are processed;

in a replacement stage, a lockless replacement algorithm is used to avoid lots of data contention in frequently modifying a logic graph, where to resolve a conflict that different threads with overlapping MFFCs probably delete a same node, a node scheduler is used to group nodes with non-overlapping MFFCs; and to resolve a conflict that MFFCs possessed by different threads do not overlap, but one thread probably wants to share a node to be deleted by another thread, a replacement process is divided into two stages: in a first stage, each block of the GPU deletes an MFFC and constructs a new subgraph; and in a second stage, each block of the GPU combines all equivalent nodes into a hyper-node, which supports concurrent deletion/creation operations for one node without introducing a lock between different threads.

Preferably, the node scheduler is a level-based node scheduler that simulates a topological order of sequential node scheduling, starts from a primary level, and progressively increases the level after selecting all nodes at the level.

Preferably, a quantity of nodes scheduled by the node scheduler within a scheduling cycle is a user-defined value that determines parallelism.

Preferably, a quantity of fan-outs of the hyper-node is a sum of fan-outs of all the equivalent nodes, and after the hyper-node is generated, a fan-out value of each equivalent node becomes invalid.

Preferably, whether any two nodes n0 and n1 are equivalent is determined according to a following method:

if all fan-in nodes of the nodes n0 and n1 point to a same hyper-node and have a same input polarity, determining that the nodes n0 and n1 are equivalent.

Firstly, in order to utilize intra-node parallelism, the present disclosure parallelizes sub-procedures of AIG-based logic rewriting. Due to limited parallelism of a recursive process, it is extremely inefficient to directly map recursive sub-procedures (such as cut and MFFC computation algorithms) of the AIG-based logic rewriting onto a GPU. Therefore, these sub-procedures are redesigned to be non-recursive, to provide sufficient parallelism for the GPU. In addition, other logic optimization or logic validation algorithms can also use the proposed parallel cut and MFFC computation algorithms to accelerate their runtime. Secondly, in order to parallelize a replacement step on the GPU, the present disclosure uses a lock to ensure mutually exclusive access, which inevitably damages scalability of inter-node parallelism. In order to fully utilize the inter-node parallelism on a large scale, the present disclosure proposes a work scheduler that adds nodes with non-overlapping MFFCs to a group, such that nodes in an MFFC can be deleted simultaneously without a conflict. In order to simultaneously create and delete a same node, the present disclosure also proposes a GPU-friendly graphical data structure to support these concurrent operations.

Compared with an existing technical solution, the present disclosure has following innovative points:

(1) The present disclosure proposes a non-recursive parallelization algorithm that can effectively utilize intra-node parallelism during rewriting, which is difficult to implement due to a highly recursive nature of an original rewriting algorithm.

(2) The present disclosure proposes a parallel lockless replacement algorithm, which includes a work scheduler capable of scheduling mutually exclusive nodes and a GPU-friendly data structure capable of supporting efficient concurrent operations. Therefore, the lockless algorithm proposed in the present disclosure has high scalability and can effectively achieve more inter-node parallelism.

(3) Compared with a most advanced GPU-based parallel method [4], the present disclosure can achieve an average acceleration of 3.81 times under same quality.

DETAILED DESCRIPTION OF THE EMBODIMENTS

The present disclosure will be further described below with reference to specific embodiments. It should be understood that these embodiments are only intended to describe the present disclosure, rather than to limit the scope of the present disclosure. In addition, it should be understood that various changes and modifications may be made on the present disclosure by those skilled in the art after reading the content of the present disclosure, and these equivalent forms also fall within the scope defined by the appended claims of the present disclosure.

Figure 1:
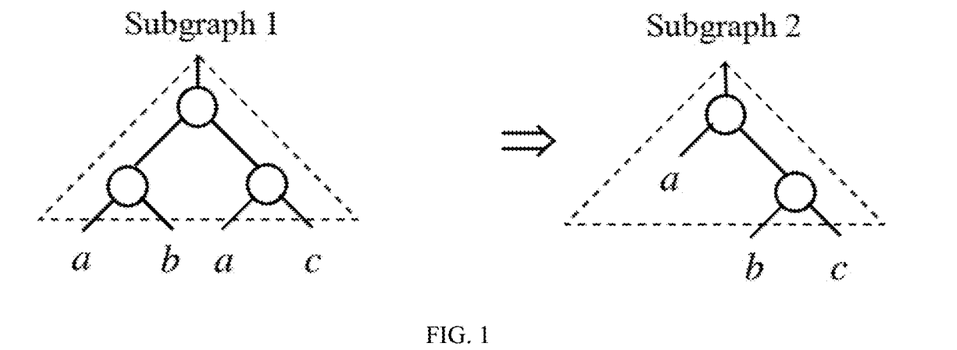
FIG. 1 illustrates an example of AIG-based logic rewriting [2]

As a directed acyclic graph, an AIG represents a structural implementation of a logical function of a circuit or network in a logic synthesis process. Each node in the AIG has an attribute named level. The level is defined as a quantity of nodes on a longest path from any input to the node. A parallel algorithm in the present disclosure is based on the level. AIG-based logic rewriting is to replace an n-input subgraph in the AIG with a logically equivalent and structurally different n-input subgraph. A subgraph for replacement has fewer nodes or can reuse other nodes in the AIG, thus reducing a quantity of nodes in a final AIG. As shown in FIG. 1, logical functions of subgraphs 1 and 2 are equivalent. Since the subgraph 2 has fewer nodes, the subgraph 1 is replaced with the subgraph 2.

Figure 2:
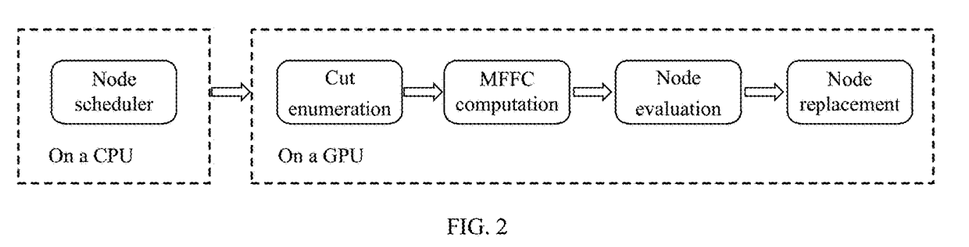
FIG. 2 illustrates a basic process of parallel AIG-based logic rewriting.

A basic process of parallel AIG-based logic rewriting is shown in FIG. 2. On a CPU, a scheduler asynchronously selects a group of same-level nodes from an input AIG-based logic network. Then, these nodes are copied to a memory of a GPU, and such that the GPU sequentially enables a kernel to rewrite these nodes in parallel. In addition, the CPU also begins to select another group of nodes for the GPU to rewrite, which completely overlaps scheduling and rewriting procedures. Four steps are performed on the GPU: cut enumeration, MFFC computation, evaluation, and replacement.

Usually, a rewriting algorithm has two types of parallelism. One type of parallelism is coarse-grained parallelism, namely, inter-node parallelism. Specifically, different nodes are processed in parallel, but processing of each node is serial. The other type of parallelism is fine-grained parallelism, namely, intra-node parallelism. In this parallel granularity, operations on each node are processed in parallel. Among the above steps, the cut enumeration and the MFFC computation are highly recursive and difficult to parallelize on the GPU. Therefore, the two steps are most challenging. In the present disclosure, algorithms for the two steps are redesigned to explore more intra-node parallelism. The inter-node parallelism is intended to rewrite a plurality of AIG nodes simultaneously. Due to a dependency relationship between nodes, it is not easy to effectively utilize the inter-node parallelism. The node replacement is a core step of logic rewriting and also the only step in which the AIG is changed. The node replacement is to replace a subgraph with an equivalent subgraph with fewer nodes, or to share a same node with another subgraph. In this step, a logic graph is frequently modified, which results in lots of data contention and hinders the inter-node parallelism. Therefore, a lockless replacement algorithm is proposed in the present disclosure to effectively resolve data conflicts. In the node evaluation, the intra-node parallelism is a common parallel paradigm, and no node is deleted and created. Therefore, it is easy to parallelize this step, and details are not described herein.

1. Lockless Inter-Node Parallelization (Node Replacement)

There may be two types of conflicts between threads in the replacement step. In a first type of conflict, if MFFCs possessed by different threads overlap, the different threads may delete a same node. In a second type of conflict, even if the MFFCs do not overlap, one thread may want to share a node to be deleted by another thread. These two types of conflicts greatly limit scalability of a parallel rewriting algorithm. To resolve the first type of conflict, a node scheduler is proposed to group nodes with non-overlapping MFFCs. To resolve the second type of conflict, a replacement process is divided into two stages. In a first stage, each block of the GPU deletes an MFFC and constructs a new subgraph. Specifically, each block creates a new node for the subgraph, even if there is an equivalent node outside the new subgraph. In a second stage, each block combines all equivalent nodes into a hyper-node. Such a data structure supports concurrent deletion/creation operations for one node without introducing a lock between different threads. This delayed equivalence search mode requires no lock and ensures correctness of utilizing the inter-node parallelism.

1) Node Scheduler

Node scheduling is crucial as it directly affects quality of a result and a level of parallelism. Two issues needs to be considered: (1) A behavior of the proposed parallel work scheduler should be similar to node scheduling based on sequential ABC (nodes are processed in a topological order) to ensure quality. (2) Selected nodes for parallel rewriting should not interfere with each other (without any lock). If the work scheduler selects an incorrect node, a lock needs to be added between thousands of threads, significantly reducing the parallelism. The scheduler is mainly used to schedule nodes with non-overlapping MFFCs, such that each thread block can delete an MFFC node without performing synchronization.

It is found that independent MFFCs can be ensured for a group of same-level nodes. A scheduling program starts from a primary input (level=0) and increases the level after selecting all nodes at the level. A quantity of nodes scheduled within a scheduling cycle is a user-defined value that determines a quantity of nodes rewritten in parallel (namely, the parallelism). In addition, the proposed level-based node scheduler also simulates a topological order of sequential node scheduling, ensuring a quality of a rewriting result. Meanwhile, the proposed level-based node scheduler still provides sufficient parallel work for parallel logic rewriting.

2) Hyper-Node

A first step in the node replacement is to delete the MFFC node. Considering the level-based node scheduler, this step can be executed in a conflictless manner. A second step is to construct the new subgraph. In this step, there are many opportunities for inter-node sharing. Whether to share a node is determined in the node evaluation. Therefore, in this step, a to-be-shared node may have been deleted or may be an MFFC node to be deleted. Therefore, in this process, in order to prevent some threads from reusing a node that may have been or will be deleted by another thread, these threads create duplicate nodes for the node, regardless of whether there is an opportunity for reusing the node.

Figure 3:
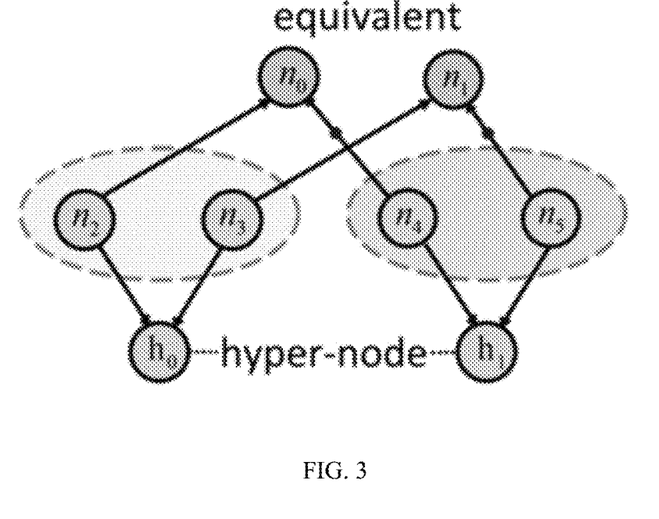
FIG. 3 illustrates a hyper-node.

In order to delete these redundant nodes and improve efficiency of simultaneously deleting equivalent nodes on the GPU, the present disclosure proposes a hyper-node graph data structure. Specifically, all equivalent nodes in the AIG form a new hyper-node, and a quantity of fan-outs of the hyper-node is a sum of fan-outs of all the equivalent nodes. After the hyper-node is generated, a fan-out value of each equivalent node becomes invalid. In this way, it is seem that these equivalent nodes are just one node. FIG. 3 shows how to detect all the equivalent nodes. To determine whether n0 and n1 are equivalent, their fan-in nodes and corresponding hyper-nodes are queried. In this example, left fan-ins of the n0 and the n1 are respectively n2 and n3. It can be observed that the n2 and the n3 point to same hyper-node h0, and the same applies to right fan-ins. Therefore, if the n0 and the n1 also have a same input polarity, the n0 and the n1 are equivalent. After the entire rewriting process, the entire AIG is scanned, and a fan-in of each node is replaced with a corresponding equivalent node. This eliminates an explicit deletion process of the node on the GPU.

2. Non-Recursive Intra-Node Parallelization

1) Parallel Cut Enumeration

A k-feasible cut serial process for a given node is recursive. Specifically, assuming C1 and C2 are two groups of cuts, a cut merge operation is defined as follows:

$$C1 \circ C2 = \{u \cup v | u \in C1, v \in C2, |u \cup v| \leq k\} \qquad (1)$$

In the above equation, ○ represents a symbol of merging the two groups of cuts, and k represents a quantity of leaf nodes in a cut ("k-feasible" indicates that the cut has k leaf nodes).

k-feasible cut set Φ(n) of node n is defined by a following recursive function:

$$\Phi(n) = \begin{cases} \{\{n\ n\}\}, & n \in PI \\ \{\{n\ n\}\} \cup [\Phi(n.\text{left}) \diamond \Phi(n.\text{right})], & \text{otherwise} \end{cases} \quad (2)$$

In the above equation, PI represents the primary input, n.left represents a left child of the node n, and n.right represents a right child of the node n.

This recursive process is not suitable a GPU platform. Therefore, the present disclosure proposes a parallel cut enumeration algorithm. When a cut of a node is computed, in order to avoid recursion, it is necessary to ensure that cuts of both left and right children have already been computed. Based on the node scheduler used in the replacement step, only nodes of a same level are scheduled together. In other words, for a new scheduling cycle, it is necessary to compute cuts of same-level newly scheduled nodes for further processing. In addition, after the replacement, some new nodes are added to the AIG. These added nodes may alter a cut set of a higher-level node. Therefore, cut sets of these newly added nodes should be computed before the newly scheduled nodes to ensure correctness of a cut enumeration function. These added nodes come from different subgraphs at different levels. Therefore, computing cuts of these nodes simultaneously can lead to an inter-node dependency problem. To address this problem, the present disclosure proposes a top-down parallel computation kernel that utilizes sufficient parallelism while ensuring an inter-node computation dependency.

Figure 4:
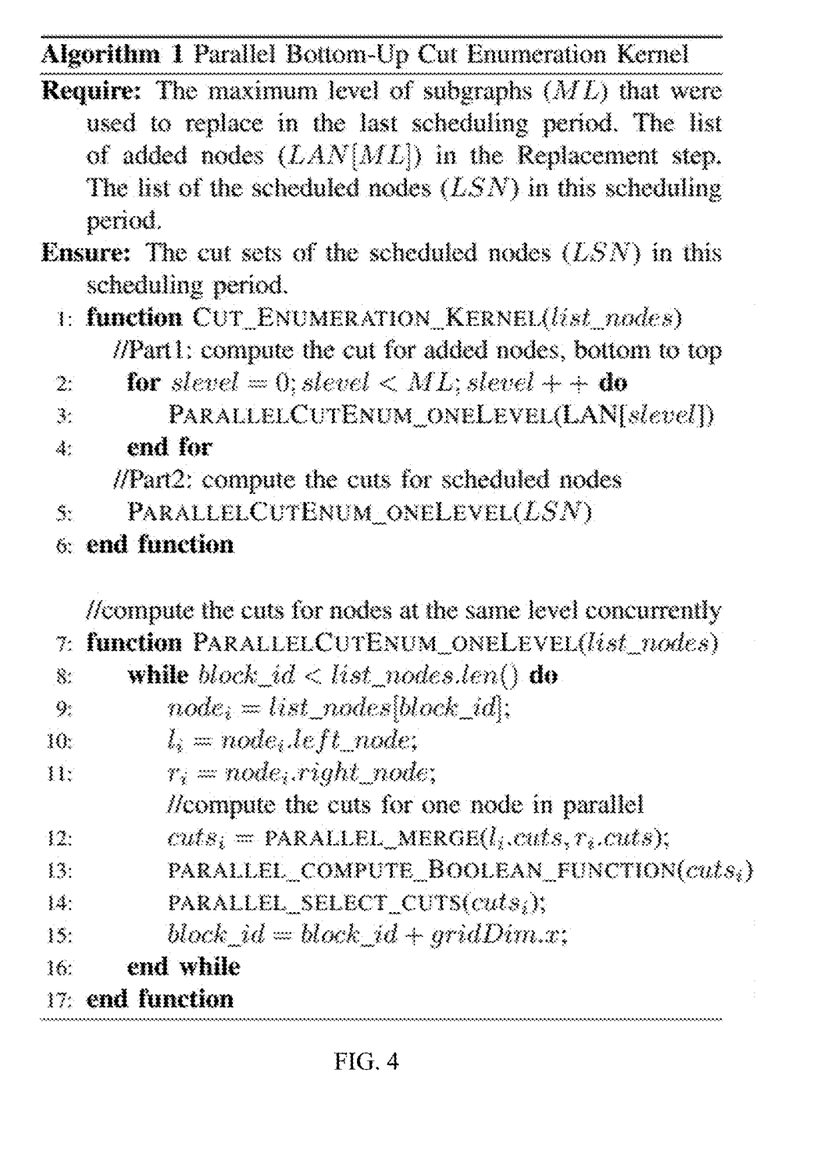
FIG. 4 illustrates a parallel cut enumeration algorithm according to the present disclosure.

As shown in FIG. 4, the parallel cut enumeration algorithm disclosed in the present disclosure is designed based on a level of the subgraph. As an uppermost-level function, CUT_ENUMERATION_KERNEL is used to compute a cut set for a given node. In a previous scheduling cycle, the replacement step has been completed for a previous group of scheduled nodes. The subgraph used for replacement is recorded, and all nodes in the subgraph are stored in list_nodes. These newly added nodes are added to different LANs[slevel] lists based on the level of the subgraph (slevel is a local level of the node in the newly added subgraph). A maximum level (ML) of the subgraph is a maximum level of all subgraphs dynamically obtained after a previous groups of nodes are replaced. Next, LANs[slevel] of these newly added same-level nodes are used as parameters of a PARALLELCUTENUM_ONELEVEL function. PARALLEL_MERGE is used to compute the cuts of these nodes in parallel (an implementation of the function is defined in the equation (2)). Then the computed cut is input into PARALLEL_COMPUTE_BOOLEAN_FUNCTION to compute a Boolean function corresponding to the cut (the Boolean function is used to search for an equivalent subgraph in a subsequent step). As each node has a fixed quantity of cuts, a quantity of cuts after cut merging doubles. Therefore, not all of these cuts are retained, and retained cuts are selected by PARALLEL_SELECT_CUTS.

A core idea of the parallel cut enumeration is to simultaneously process the same-level nodes from a low level to a high level (row 2). This computation mode breaks a dependency relationship between the added nodes. For example, if node n with level=4 is being processed, cut sets of child nodes of the node n can be merged safely, as it is guaranteed that all nodes with level<4 have a computed cut set. The sufficient parallelism is also expanded because all the same-level nodes are processed simultaneously. After the cuts of the newly added nodes are computed, cuts of these scheduled nodes can be computed, and these computed cuts are used in a subsequent step.

2) Parallel MFFC Computation

The present disclosure provides a top-down computation mode for parallelizing a recursive MFFC algorithm. To unlock the parallelism, the proposed method should process a plurality of nodes simultaneously and effectively check whether these nodes are in an MFFC. Based on a definition of the MFFC, it can be concluded that if all fan-outs of a node (except for a root node) are in the MFFC, the node is also in the MFFC. A core idea of the proposed method is to maintain a subset of the MFFC and a to-be-processed node in a correct order, such that whether the node is in the MFFC is checked only by viewing the subset of the MFFC.

Figure 5:
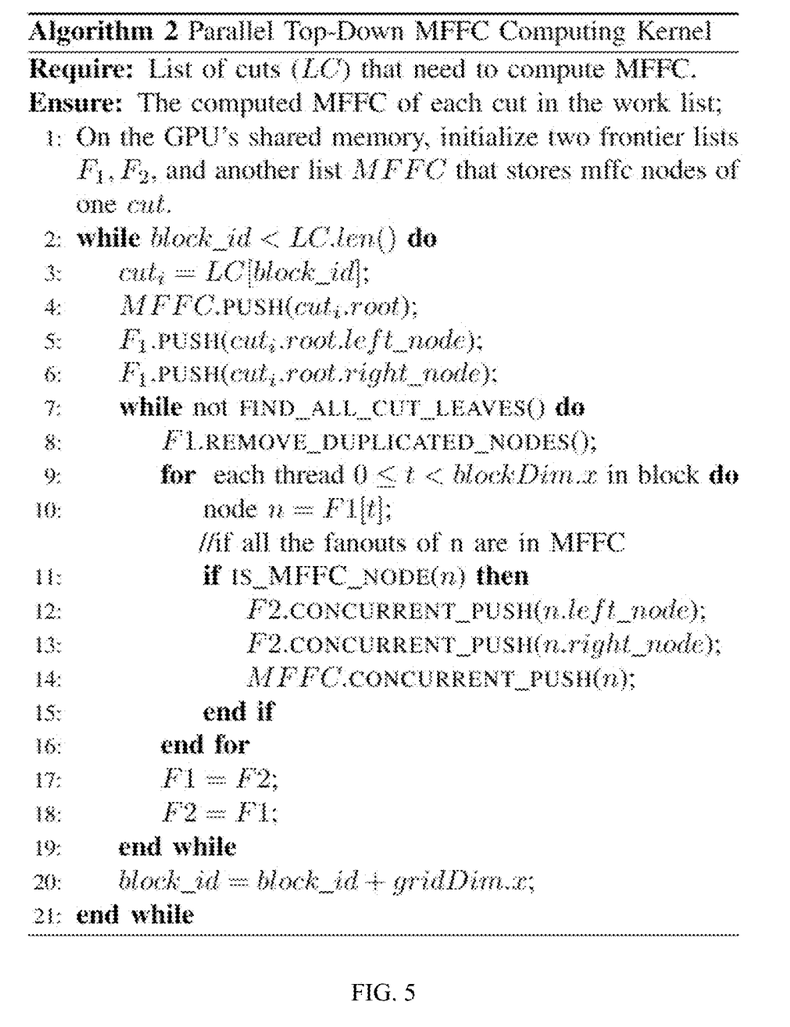
FIG. 5 illustrates a top-down computation mode for parallelizing a recursive MFFC algorithm.

As shown in FIG. 5, the MFFC algorithm disclosed in the present disclosure requires three data structures: F1 and F2 lists, which are used to temporarily store an intermediately processed node, and the MFFC that is a set that stores all last MFFC nodes. The MFFC algorithm starts with a cut list on which the MFFC computation needs to be performed. Each MFFC computation of a cut is allocated to a thread block, and threads in the same block collaborate to compute an MFFC of the cut. When the thread block obtains the corresponding cut (LC[block_id]), a root node of the cut is first added to an MFFC set corresponding to the root node (row 4). The MFFC algorithm allocates two buffering regions F1 and F2 to store a boundary of a current search. Firstly, left and right children of the root node are added to the F1 (rows 5 and 6). Each thread extracts one node n from the F1 (row 10). If all fan-outs of the one node n are in a current MFFC set, a function IS_MFFC_NODE(n) is evaluated as true (row 11). Then, all children (all the fan-outs) of the one node n are added to the F2, and the one node n is added to the MFFC (rows 12 to 14). When all nodes in the F1 are processed, a for cycle ends (row 9), and roles of the F1 and the F2 are swapped (rows 17 to 19). After all leaf nodes of the cut are processed, FIND_ALL_CUT_LEAVES is evaluated as true, and a while cycle ends (row 7). Because one node may have a plurality of parents, the one node is repeatedly added to the F2 (F1 after the role swapping). F1.REMOVE_DUPLICATED_NODES is used to delete a duplicate node (row 8).

As described above, based on the definition of the MFFC, if all fan-outs of a node (except for the root node) are in the MFFC, the node is also in the MFFC. The node is processed in a parallel breadth-first search (PBFS) order. Therefore, whether all the fan-outs of the node are in the MFFC is determined before whether the node is in the MFFC is determined. If all the fan-outs of the node are in the MFFC, the node is added to the MFFC. Therefore, it is enough to only check whether the node is in the MFFC from the MFFC. Because all fan-outs of a current boundary node in the MFFC are pushed into the MFFC, nodes from a same boundary never become fan-outs of each other. Therefore, it is always safe to process these nodes in parallel for the MFFC computation.

The above algorithm is implemented on a computer system with the GPU to achieve fast circuit synthesis.

What is claimed is:

1. A graphics processing unit (GPU)-based logic rewriting acceleration method, comprising parallelizing sub-procedures of And-Inverter Graph (AIG)-based logic rewriting, wherein the parallelizing sub-procedures of AIG-based logic rewriting comprises the following steps:

on a central processing unit (CPU), asynchronously selecting, by a scheduler, a group of same-level nodes from an input AIG-based logic network; then copying the nodes to a memory of a GPU, such that the GPU sequentially enables a kernel to rewrite the nodes in parallel, and selecting, by the CPU, another group of nodes for the GPU to rewrite, which completely overlaps scheduling and rewriting procedures; and on the GPU, completing parallel node rewriting through cut enumeration, maximum fan-out-free cone (MFFC) computation, evaluation, and replacement, wherein the cut enumeration adopts a parallel cut enumeration algorithm designed based on a subgraph level, to simultaneously process the same-level nodes from a low level to a high level; nodes in a subgraph used for replacement in a previous scheduling cycle are added to different LAN[slevel] lists based on a level of the subgraph, wherein slevel represents a local level of a node in the subgraph used for replacement, cuts of nodes in a same LAN[slevel] list are computed in parallel, and then Boolean functions corresponding to the cuts are computed; and the MFFC computation adopts a top-down computation mode to parallelize a recursive MFFC computation algorithm, wherein starting from a cut list on which the MFFC computation requires to be performed, each MFFC computation of a cut is allocated to a thread block, threads in the same thread block collaborate to compute an MFFC of the cut, and after the thread block obtains the corresponding cut, following steps are performed:

step 1: adding a root node of a current cut to a corresponding MFFC set of the root node, wherein the MFFC is a set that stores all last MFFC nodes;

step 2: adding left and right children of the root node to a buffering region F1; extracting, by each thread, a node n from the buffering region F1; if all fan-outs of the node n are in a current MFFC set, evaluating a function IS_MFFC_NODE(n) as true; and in this case, adding all the fan-outs of the node n to a buffering region F2, and adding the node n to the MFFC set;

step 3: repeating the step 2 until all nodes in the buffering region F1 are processed, and then swapping roles of the F1 and the F2; and step 4: processing one leaf node of the current cut by using a method that is the same as a method described in the steps 2 to 3, until all leaf nodes of the current cut are processed;

in a replacement stage, a lockless replacement algorithm is used to avoid lots of data contention in frequently modifying a logic graph, wherein to resolve a conflict that different threads with overlapping MFFCs delete a same node, a node scheduler is used to group nodes with non-overlapping MFFCs; and to resolve a conflict that MFFCs possessed by different threads do not overlap, but one thread wants to share a node to be deleted by another thread, a replacement process is divided into two stages: in a first stage, each block of the GPU deletes an MFFC and constructs a new subgraph; and in a second stage, each block of the GPU combines all equivalent nodes into a hyper-node that supports concurrent deletion/creation operations for one node without introducing a lock between different threads.

2. The GPU-based logic rewriting acceleration method according to claim 1, wherein the node scheduler is a level-based node scheduler that simulates a topological order of sequential node scheduling, starts from a primary level, and progressively increases the level after selecting all nodes at the level.

3. The GPU-based logic rewriting acceleration method according to claim 2, wherein a quantity of nodes scheduled by the node scheduler within a scheduling cycle is a user-defined value that determines parallelism.

4. The GPU-based logic rewriting acceleration method according to claim 1, wherein a quantity of fan-outs of the hyper-node is a sum of fan-outs of all the equivalent nodes, and after the hyper-node is generated, a fan-out value of each equivalent node becomes invalid.

5. The GPU-based logic rewriting acceleration method according to claim 1, wherein whether any two nodes n0 and n1 are equivalent is determined according to a following method:

if all fan-in nodes of the nodes n0 and n1 point to a same hyper-node and have a same input polarity, determining that the nodes n0 and n1 are equivalent.

* * * * *